Dec. 7, 1937. R. M. HAY 2,101,255
METHOD OF MAKING PESSARIES
Original Filed March 1, 1930

INVENTOR
Rene M. Hay
BY
ATTORNEY

Patented Dec. 7, 1937

2,101,255

UNITED STATES PATENT OFFICE 2,101,255

METHOD OF MAKING PESSARIES

Rene M. Hay, New York, N. Y., assignor to Durex Products, Inc., a corporation of New York Application March 1, 1930, Serial No. 432,306
Renewed January 14, 1937

10 Claims. (Cl. 18—59)

My invention relates to a new and improved method of manufacturing pessaries, which results in a new and improved product.

My invention is applicable to various types of pessaries, but will be shown and described in connection with one type only.

Heretofore, pessaries have been made by dipping a mold into a solution of rubber that has been dissolved in suitable solvents. The mold is lifted from the solution and permitted to dry, which process allows the solvents to evaporate. This dipping and drying, or evaporating, is continued until a layer of proper thickness has been formed upon the mold.

A flat spring is then placed over the mold, located at the proper point upon the rubber, and then rolled into the bottom of the pessary for the required distance to cover the spring, a proper seal being effected at this point to prevent the unrolling of the rubber from about the spring.

It is apparent to anyone experienced in this method of manufacture that the evaporation process is never complete so that the pessary thus formed still contains some of the solvents. This condition renders the pessaries easily affected by light, heat, and oxidation.

Moreover, bubbles are formed between the separate layers caused by the separate dippings, and even in the individual layers. These bubbles naturally are weakened spots that render the pessary easily damaged, and even more subject to deterioration at these places.

Furthermore, such a process requires that a mold be in constant use during the entire process of manufacture, until the completed pessary is formed, so that in manufacture there is a large investment tied up in many molds.

It is one object of my invention to provide a method of manufacture that eliminates the necessity for the use of dissolved rubber with the consequent dipping process.

It is another object of my invention to provide a method of manufacture that is much less expensive and much more adjustable to rapid production than the processes heretofore in use.

It is a further object of my invention to produce a pessary that is free from defects and more durable.

It is a still further object of my invention to provide a pessary made from a sheet of pure rubber.

Other and further objects of my invention will be apparent from the following description, taken in conjunction with the accompanying drawing, wherein—

Figure 1:
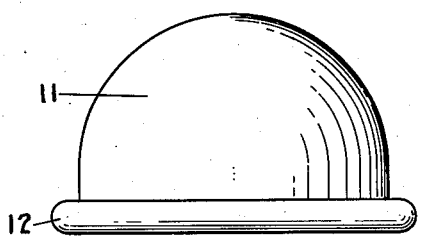
Figure 1 is a side elevation of a pessary made in accordance with my invention.
Figure 2:
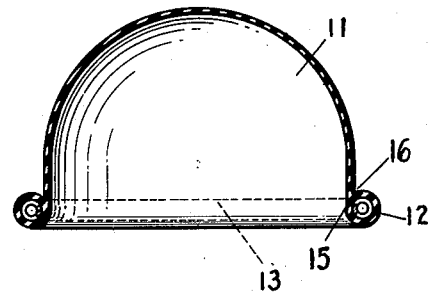
Fig. 2 is a vertical central section of the pessary of Fig. 1.
Figure 3:
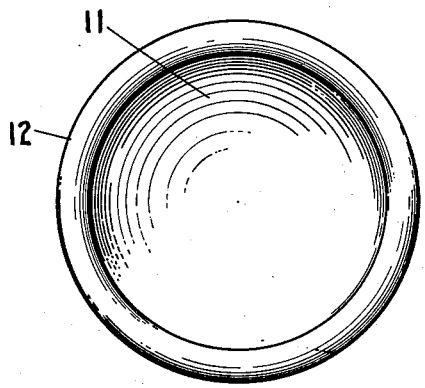
Fig. 3 is a bottom plan view.
Figure 4:
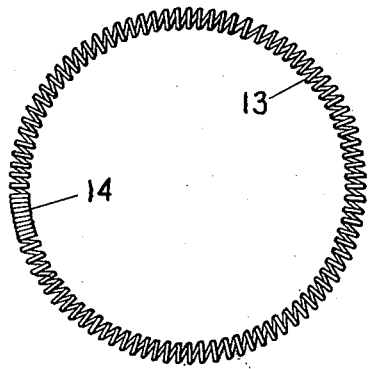
Fig. 4 is a detailed view of the coiled spring used in forming the rim of the pessary.

Referring to the drawing, the pessary comprises a dome 11 having an outwardly extending annular rolled rim 12. The rim 12 is formed by a coiled spring 13, the ends of which are joined together as shown at 14 to form an endless ring, about which the end of the pessary material is rolled to form the rim 12 as will be hereinafter described.

Figure 5:
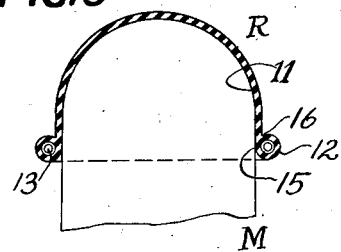
Fig. 5 is a view, in vertical section, similar to Fig. 2, of a pessary in course of formation upon a mold, shown in elevation.

My process of manufacture consists in drawing or stretching a piece of unvulcanized sheet rubber R of pure stock over a dome shaped mold, M, (see Fig. 5). The sheet is pulled down to a predetermined position on the mold to form the dome in the rubber. The coiled spring 13 is then placed in position over the mold and at the bottom of the dome. The ends of the sheet are rolled around the coiled spring so that it is properly covered, whereupon the ragged ends are trimmed off. The coil may then be given another turn if desired, giving it a second covering of rubber.

The rim and the sheet are then vulcanized in any usual manner while holding the pessary stretched to its final shape on the mold, the vulcanization occurring both on the inside of the rim, as indicated at 15, and on the outside of the dome where it joins the roll 12, as indicated at 16, thus sealing the ring 13 in place.

If the sheet is of pure rubber or rubber compound, vulcanization would be carried out by exposure to the action of sulphur chloride in such manner as is well known in the art.

If the sheet rubber were made of a mixture of sulphur, rubber, and vulcanization accelerator, vulcanization could be carried out by means of steam.

As soon as the vulcanization is completed, the completed pessary is removed from the mold, and the mold is ready for use in the manufacture of another pessary.

It will be apparent that by my process I have made it possible to combine a coiled spring with a dome made out of sheet rubber, so that no solvents are present in the finished product, and I thus have a new type of pessary more durable than any made by the processes heretofore in use.

Modifications may be made in the arrangement and location of parts, and in the steps of the above described process, without departing from the spirit and scope of my invention, and such modifications are intended to be covered by the appended claims.

I claim:

1. The method of manufacture of pessaries, which consists in drawing a sheet of unvulcanized rubber over a mold, fitting a ring about the mold and outside the sheet, rolling the ends of the sheet about the ring so as to enclose it, vulcanizing the whole pessary, and removing the completed pessary from the mold.

2. The process of producing pessaries which consists in forming a hollow dome from flat sheet rubber by stretching the rubber over a suitably shaped mold, fitting a ring about the mold and outside the sheet, rolling the ends of the sheet about the ring so as to enclose it, vulcanizing the whole pessary, and removing the completed pessary from the mold.

3. In the process of fabricating a pessary, the step of rolling the marginal portion of a sheet of rubber about a circular spring and then vulcanizing said sheet.

4. In the process of fabricating a pessary, the step of deforming unvulcanized sheet rubber into a preparatory shape by drawing the unvulcanized sheet rubber over a mold having in part at least a cylindrical shape, to impart said cylindrical shape to the unvulcanized sheet rubber; and the step of establishing said cylindrical shape by rolling a spring of annular form into the margin of said cylindrical preparatory shape of unvulcanized sheet rubber.

5. The process of fabricating a pessary, which comprises deforming unvulcanized sheet rubber into a preparatory shape by drawing the unvulcanized sheet rubber over a mold having in part at least a cylindrical shape, to impart said cylindrical shape to the unvulcanized sheet rubber; rolling a spring of annular form into the margin of said cylindrical preparatory shape of unvulcanized sheet rubber; and then vulcanizing the entire pessary while holding the pessary stretched to the desired final shape.

6. The method of manufacture of pessaries, which consists in drawing a sheet of unvulcanized rubber over a mold, fitting a ring about the sheet while on the mold and leaving a marginal portion of sheet material available for enclosing said ring, rolling said marginal portion about the ring, while on said mold, and vulcanizing the entire pessary while holding the pessary stretched to the desired final shape.

7. The method of manufacture of a pessary which comprises the step of applying to unvulcanized sheet rubber a tensile force to stretch it on a mold into a preparatory shape larger than the original shape, whether flat or partially deformed; the step of rolling a spring into the margin of said preparatory shape; and the step of vulcanizing said shape with the rolled-in spring in place, and the central web under stretch.

8. In the process of fabricating a pessary, the step of rolling the marginal portion of a sheet of rubber about a circular spring and then vulcanizing said sheet upon a mold having the desired size and shape of the finished pessary.

9. In the process of fabricating a pessary, the step of rolling the marginal portion of a sheet of rubber about a circular spring and then vulcanizing said sheet upon a mold having the desired size and shape of the finished pessary with the central web of the rubber sheet under stretch.

10. In the manufacture of a pessary, the procedure which includes the step of vulcanizing a sheet of rubber having a spring rolled in the marginal portion thereof, while holding the sheet of rubber stretched to substantially the final shape of the pessary.

RENE M. HAY.